United States Patent
Müller

[11] Patent Number: 6,162,071
[45] Date of Patent: Dec. 19, 2000

[54] RECESSED ELECTRIC RECEPTACLE AND WORK SURFACE

[75] Inventor: Mark Müller, Uxbridge, Canada

[73] Assignee: Nienkämper Furniture & Accessories, Inc., Toronto, Canada

[21] Appl. No.: 09/243,426

[22] Filed: Feb. 3, 1999

Related U.S. Application Data

[63] Continuation-in-part of application No. 08/936,832, Sep. 25, 1997, Pat. No. 5,980,279.

[51] Int. Cl.$^7$ .................................................. H01R 13/44
[52] U.S. Cl. ............................................. 439/142; 174/48
[58] Field of Search .................................. 439/142, 131; 174/48

[56] References Cited

U.S. PATENT DOCUMENTS

| | | | |
|---|---|---|---|
| 3,992,070 | 11/1976 | Dunn et al. | 439/131 |
| 4,335,269 | 6/1982 | Haskins | 174/48 |
| 4,656,798 | 4/1987 | Hazen | 52/221 |
| 4,792,881 | 12/1988 | Wilson et al. | 439/131 |
| 4,984,982 | 1/1991 | Brownlie et al. | 439/131 |
| 5,008,491 | 4/1991 | Bowman | 174/48 |
| 5,230,552 | 7/1993 | Schipper et al. | 439/131 |
| 5,448,799 | 9/1995 | Stein, Jr. | 16/225 |
| 5,575,668 | 11/1996 | Timmerman | 439/131 |

FOREIGN PATENT DOCUMENTS

| | | | |
|---|---|---|---|
| 0 726 631 A2 | 8/1996 | European Pat. Off. | H02G 3/18 |

*Primary Examiner*—T. C. Patel
*Attorney, Agent, or Firm*—Dimock Stratton Clarizio; Mark B. Eisen

[57] ABSTRACT

An electrical receptacle adapted to be recessed into a work surface, having a concealed compartment containing electrical ports for connection to a remote power supply and communications devices and an exposed compartment for connecting electrical cables to the ports. The ports are mounted on a partition plate isolating the exposed compartment from the concealed compartment, which is disposed at an oblique angle relative to the work surface to facilitate the connection and detachment of electrical cables and reduce clutter in the work space. The receptacle housing is preferably formed from components which are longitudinally linear, and are thus able to be extruded from aluminum and formed to interlock so that the housing can be assembled without welding. In the preferred embodiment the front portion is engaged to the rear portion along a slip-fit interlock and the partition plate is engaged between the front and rear portions in snap-fit relation. The cover plate is snap-fitted to the rear portion along a hinge disposed at an intermediate position on the cover plate, mounted in cantilevered relation with its rear edge abutting a stop surface disposed along an upper limit of the rear portion to maintain the cover plate flush with the work surface in the closed position.

18 Claims, 4 Drawing Sheets

RECESSED ELECTRIC RECEPTACLE AND WORK SURFACE

CROSS-REFERENCE TO RELATED APPLICATIONS

This application is a continuation-in-part of U.S. application Ser. No. 08/936,832, filed Sep. 25, 1997, now U.S. Pat. No. 5,980,279.

FIELD OF INVENTION

This invention relates to electrical receptacles. In particular, this invention relates to a recessed receptacle for a workstation or table which permits the connection of electrical cables to ports providing remote power supply and/or communications connections.

BACKGROUND OF THE INVENTION

Today's workplace incorporates many kinds of electrical devices, most notably computers (particularly personal computers) and communications facilities such a voice and data transmission lines. A typical workstation will have a computer which may be connected to modem, to a local area network (LAN), to a dedicated or shared printer and/or remote storage devices, intercom, video interface and many other widely available electrical devices that increase productivity and communications capacity in the workplace.

Most such devices require a power supply, and many require communications cables to interface with other local and remote devices. In a permanent workstation the power supply and interface cabling can be installed and bundled, but this tends to be unsightly and can interfere with the efficient use of space in a small workstation. In temporary workstations such as boardroom tables, research cubicles and the like where portable devices (eg. laptop computers, video monitors etc.) are used, it can be cumbersome and time consuming to connect and organize power supply and interface cables for a short period of use.

Permanent floor-mounted receptacles or "floor monuments" are available for such purposes, but they often cannot be conveniently located in anticipation of where such facilities may be required, and they reduce the ability to rearrange office furniture. Receptacles affixed to or recessed into the work surface itself have recently become more popular, but they tend to be difficult to use because the cabling is connected to the receptacle at an angle perpendicular to the work surface and thus protrudes upwardly into the work space. Where a receptacle is recessed accessibility is significantly diminished because the connection ports are often not easily visible and a user must approach the receptacle from directly above it. In a large work surface such as a boardroom table can require that the user lean uncomfortably over the table while attempting to align the cable plug with the compatible port for connection, and the vertical motion required to connect or disconnect a cable is awkward and unnatural making connecting and disconnecting electrical cables physically difficult.

SUMMARY OF THE INVENTION

The present invention overcomes these disadvantages by providing an electrical receptacle adapted to be recessed into a work surface, in which the power supply, communications, video and any other desired ports are disposed at an oblique angle relative to the work surface. Thus, the user has a direct line of sight to the port plate from a normal standing position, and can insert a plug into (or detach a plug from) the appropriate port relatively laterally, which is a more natural motion that facilitates connection or detachment especially where the plug and the port fit very snugly together. Further, because of the oblique angle of the ports the cabling protrudes from the receptacle substantially flush with the work surface, providing a less cluttered appearance and diminishing intrusive interference with the use of the work space.

In the preferred embodiment the invention comprises an exposed compartment for connecting electrical cables to the ports having a cover which closes flush with the work surface and leaves a small gap for the egress of cables from the receptacle, and a concealed compartment isolated from the exposed compartment which contains the electrical ports and wiring in communication with one or more remote devices and/or power supplies. The receptacle of the invention is thus much more accessible from a user's normal working position, and provides a less cluttered and more efficiently organized work space.

The cover plate is snap-fitted to the rear portion along a hinge disposed at an intermediate position on the cover plate, mounted in cantilevered relation. In one embodiment the rear edge of the cover plate abuts a stop surface disposed along an upper limit of the rear portion to maintain the cover plate flush with the work surface in the closed position.

The present invention thus provides an electrical receptacle adapted to be recessed into a work surface, comprising a concealed compartment containing ports in electrical communication with at least one remote device or power source and an exposed compartment for connecting electrical cables to the ports, accessible through the work surface, and a cover plate having a hinge extending longitudinally along an intermediate portion of the cover plate forming a channel adapted to engage a pivot comprising an enlarged bead extending longitudinally along an intermediate portion of the receptacle, to mount the cover plate in cantilevered relation on the receptacle substantially flush with the work surface.

The present invention further provides a work surface having at least one electrical receptacle mounted therein, the electrical receptacle comprising a concealed compartment containing ports in electrical communication with at least one remote device or power source and an exposed compartment for connecting electrical cables to the ports, accessible through the work surface, and a cover plate having a hinge extending longitudinally along an intermediate portion of the cover plate forming a channel adapted to engage a pivot comprising an enlarged bead extending longitudinally along an intermediate portion of the receptacle, to mount the cover plate in cantilevered relation on the receptacle substantially flush with the work surface.

BRIEF DESCRIPTION OF THE DRAWINGS

In drawings which illustrate by way of example only a preferred embodiment of the invention.

DETAILED DESCRIPTION OF THE INVENTION

Figure 1:
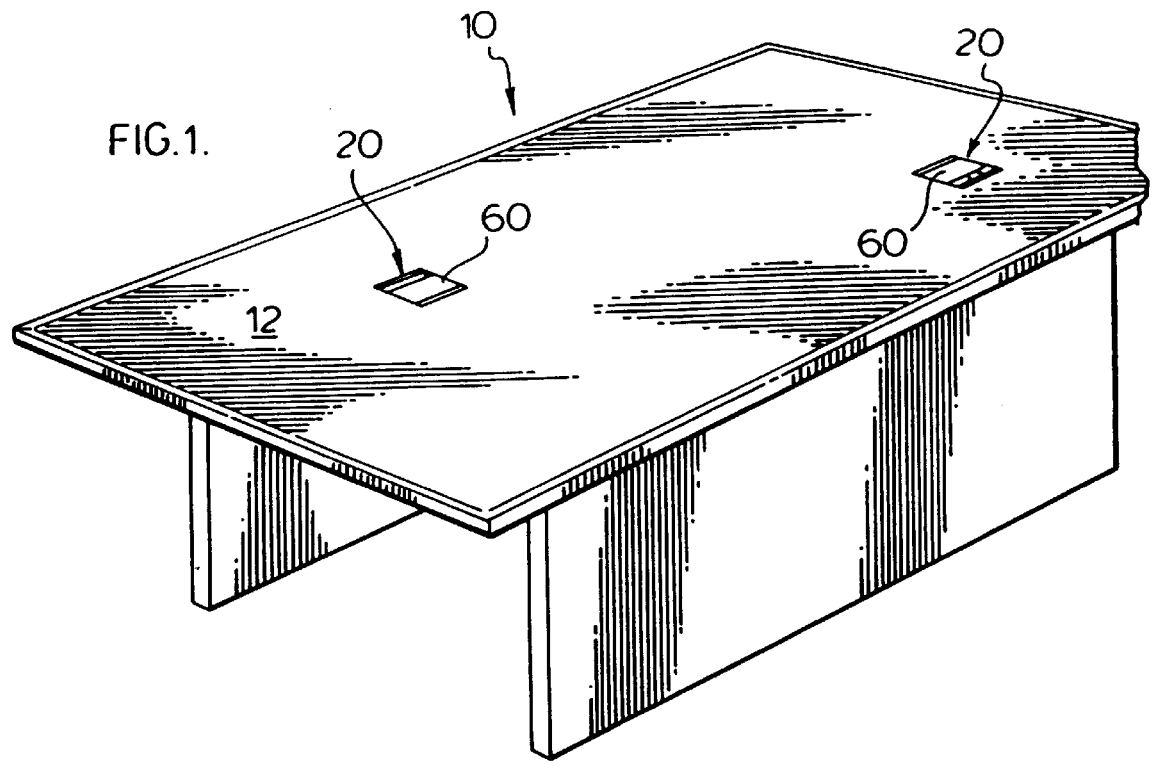
FIG. 1 is a perspective view of a table embodying the invention.
Figure 2:
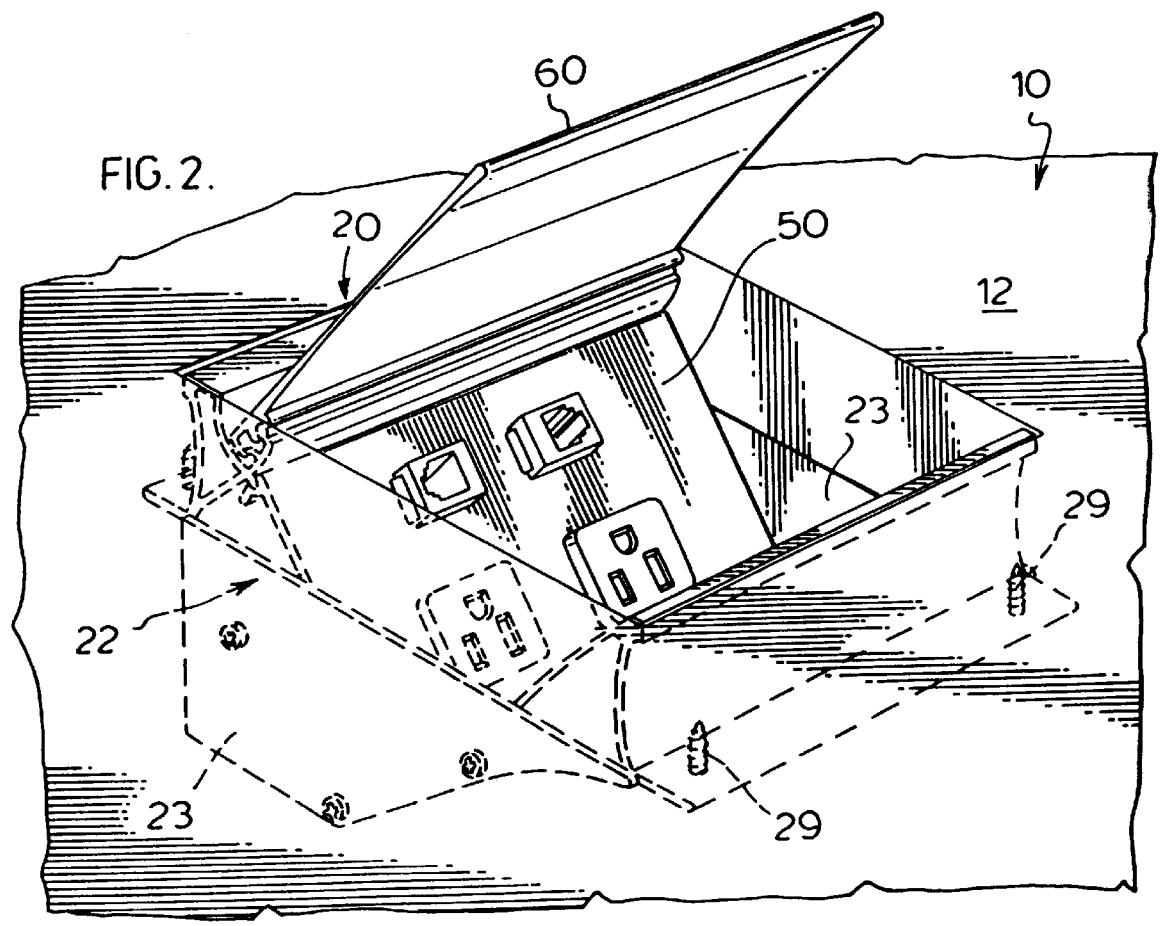
FIG. 2 is a perspective view of an electrical receptacle of the invention with the cover plate open.

FIG. 1 illustrates a boardroom table 10 having a work surface 12 embodying the invention. The table 10 is provided in suitable locations with receptacles 20 of the invention, recessed into the table preferably such that the receptacles 20 are flush with the work surface 12. The invention will be described with reference to the table 10 shown in FIG. 1, however it will be appreciated that the invention can be equally applied to any other work surface 12, including desks, workstations, cubicles, countertops and the like, and the invention is not intended to be limited to any particular type of work space.

In the preferred embodiment the receptacle 20 comprises an outer housing 22 which houses a concealed compartment 30 containing electrical ports of any desired type, such as standard power supply port 2 and/or communications port 4, and an exposed compartment 40 which is accessible to a user for connecting and disconnecting electrical cables such as a power cable 6 and/or communications interface cable 8 to the respective ports 2, 4. The ports 2, 4 are accessible through the top opening 42 of the exposed compartment 40, which is covered by a hinged cover plate 60 that in the closed position rests substantially flush with the work surface 12.

Figure 4:
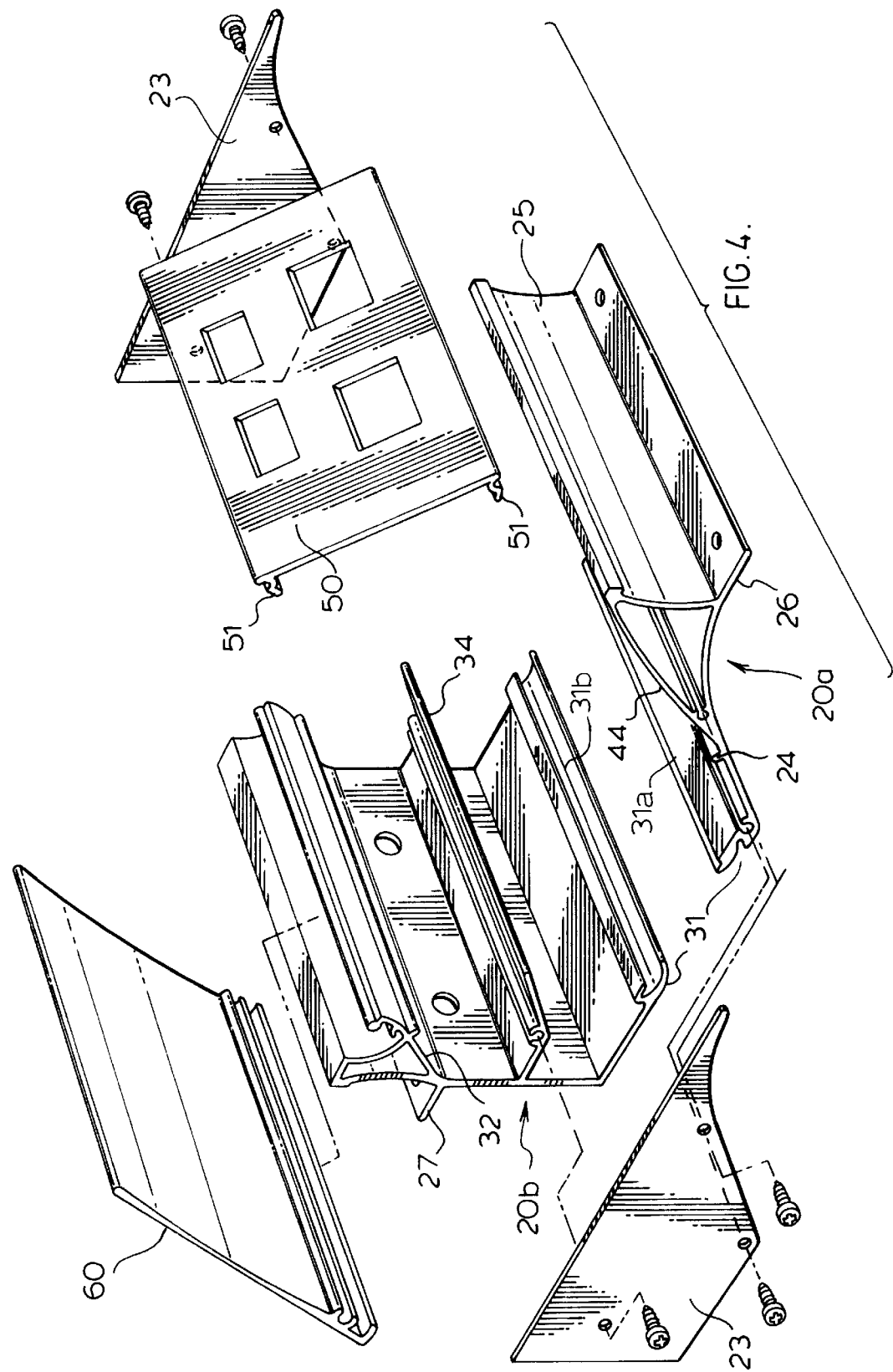
FIG. 4 is an exploded perspective view of the electrical receptacle of FIG. 2.

The receptacle 20 is preferably formed from the following components, illustrated in FIG. 4: A front portion 20a; a rear portion 20b which interlocks with the front portion 20a along a slip-fit interlock 31, a partition plate 50, the cover plate 60 and end plates 23. The various components of the receptacle 20 are preferably longitudinally linear, i.e. the components have no curvature or other non-linear topography in the longitudinal direction, which allows them to be extruded, for example from aluminum, plastic or any other suitable material permitted by local electrical codes.

In the preferred embodiment one of the front or rear portions 20a, 20b is provided with an enlargement and the other of the front or rear portions is provided with a complimentary channel adapted to receive the enlargement in interlocking relation as along interlock 31 disposed longitudinally along the bottom edges of the portions 20a, 20b.

Figure 3:
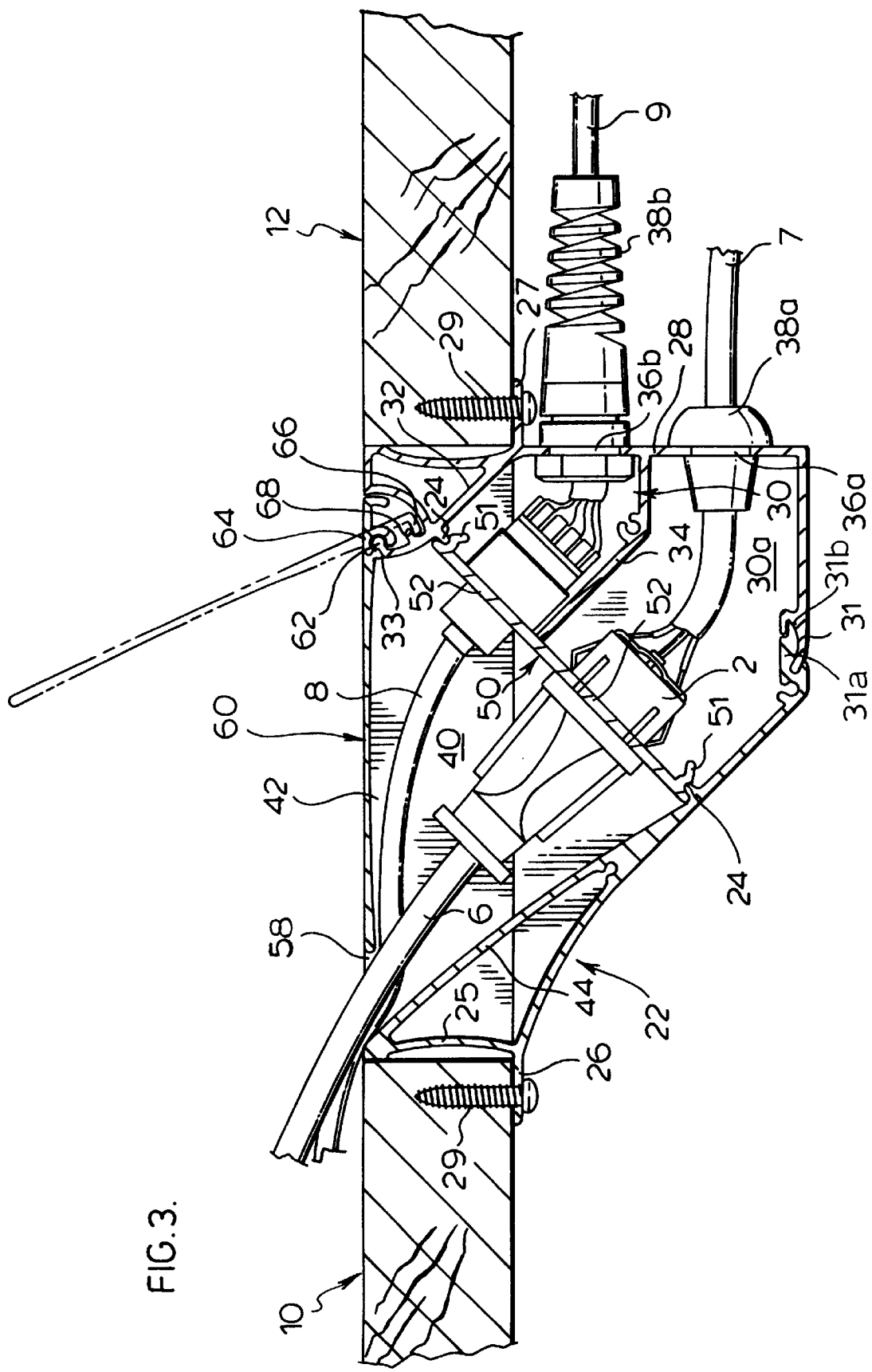
FIG. 3 is a side cross-section of the electrical receptacle of FIG. 2 showing the cover plate in closed and open positions.

As shown in FIG. 3, the ports 2, 4 are mounted in conventional fashion on a partition plate 50 which isolates the exposed compartment 40 from the concealed compartment 30. The partition plate 50 is provided with openings suitable for accommodating the ports 2, 4, and extends fully between the end plates 23 of the receptacle 20. The partition plate 50 is preferably removable, in the embodiment shown being detachably affixed by tabs 51 which snap-fit to a pair of opposing lips 24 projecting from the housing 22.

The partition plate 50 is mounted to the housing 22 at an oblique angle relative to the work surface 12, in the preferred embodiment shown approximately 45°, so that a user can approach the ports 2, 4 from a natural angle when standing in front of the table 10. It will be appreciated that other angles may be appropriate for a particular use, depending for example on how far the receptacle 20 is set back from the edge of the table 10, and the invention is not intended to be limited to the specific angle illustrated. The front end 44 of the exposed compartment 40 preferably approaches the partition plate 50 at approximately a right angle, which facilitates accessibility of the ports 2, 4, provides an attractive appearance and renders the exposed compartment 40 easier to clean.

In the preferred embodiment the exposed compartment 40 thus forms substantially a right-angled triangle in cross-section, with the hypotenuse parallel to and substantially flush with the work surface 12. In the embodiment illustrated the front end 44 of the exposed compartment 40 extends to the work surface, while the housing 22 diverges therefrom and is affixed to the underside of the table at tab or lip 26. For additional reinforcement a web 25 connects the top edge of the front end 44 of the exposed compartment 40 to the housing 22.

The concealed compartment 30 is defined by the housing 22, the partition plate 50 and a wall 32. In the embodiment shown the concealed compartment 30 accommodates a communications port 4 and a power supply port 2, isolated from one another by a divider 34 to form separate power supply and communications compartments 30a, 30b within the concealed compartment 30. The rear wall 28 of the housing 22 is provided with suitable openings 36a, 36b for strain relief sleeves 38a, 38b through which the power supply and communications wiring 7, 9 enter the concealed compartment 30. The rear wall 28 mounts to the underside of the table 10 at tab or lip 27. The dimensions of the concealed compartment 30 and spacing of the divider 34 should meet electrical code requirements for the particular region in which the receptacle 20 is intended to be used, as will be known to those skilled in the art.

The cover plate 60 when closed does not extend fully to the front of the receptacle, leaving a gap 58 through which the connected cables 6, 8 emerge from the receptacle 20 to the various electrical devices (not shown) to which they are connected. In the embodiment shown in FIGS. 1 to 4 the rear of the cover plate 60 is provided with a hinge 64 that mounts about a pivot 62, which is preferably formed on the top edge of the wall 32, allowing the cover plate 60 to swing from the closed position (shown in solid lines in FIG. 3) to the open position (shown in phantom line s in FIG. 3). A flange 66 along the rear of the cover plate 60 is provided with an enlarged edge, which snap-fits under a tooth 68 formed beneath the hinge pivot 62, allowing the cover plate 60 to be locked into the open position. The hinge 64 is designed to abut a ledge 33 formed in the wall 32 when the cover plate 60 is flush with the work surface 12, so that the closed cover plate 60 does not rest against the cables 6, 8.

Figure 5:
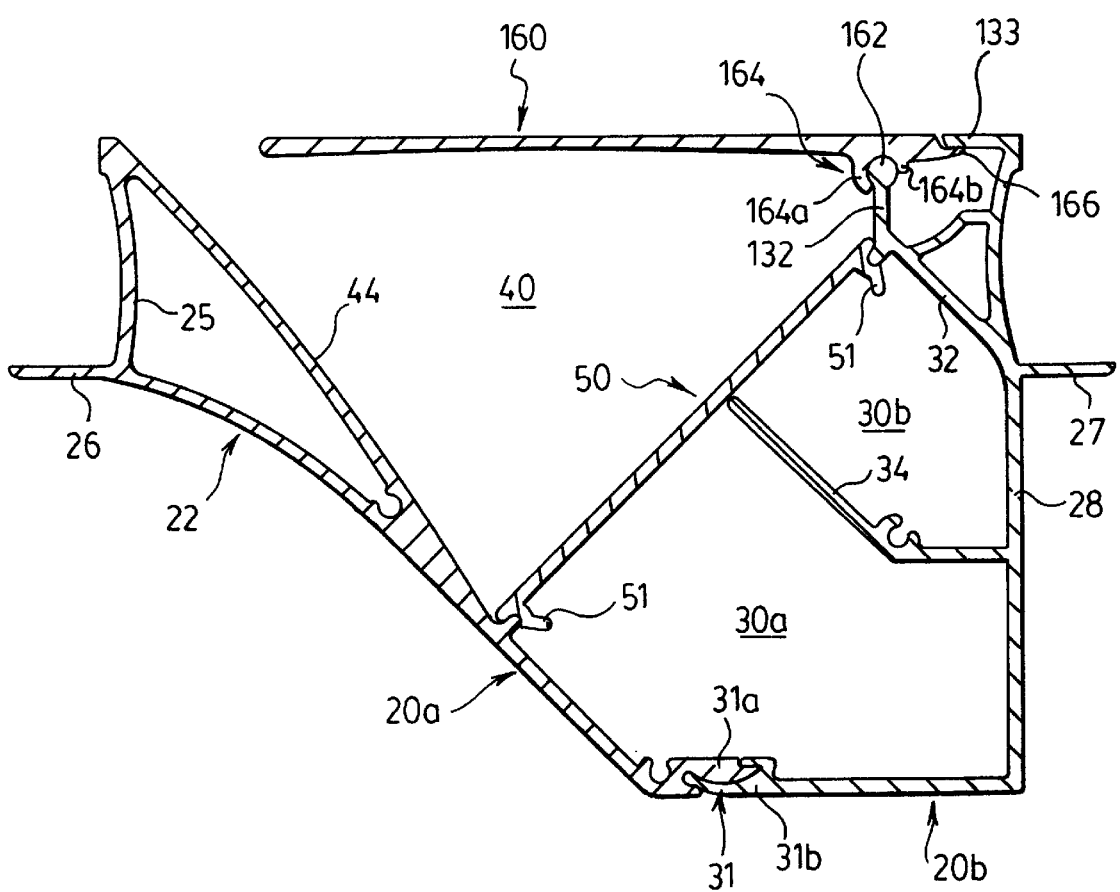
FIG. 5 is a side elevation showing a further embodiment of the cover for the electrical receptacle.

In a further embodiment, illustrated in FIG. 5, the cover plate 160 is provided with a hinge 164 that preferably extends along the entire cover plate and mounts about a pivot 62, comprising an enlarged bead preferably circular in cross-section and formed along the entire top edge of hinge wall 132. The hinge 164 comprises a front member 64a and a rear member 164b, which together create a channel circular in cross-section and forming an arc greater than 180° so that the hinge 164 grasps the pivot 62 in snap-fit engagement. The front member 164a is dimensioned to lie spaced slightly from the wall 132 when the cover 160 is closed, while the rear member 164b is truncated to allow the cover 160 to swing to an open position at an angle of approximately 65° relative to the work surface 12.

The top surface of the rear edge 166 of the cover plate 160 is preferably recessed, providing a surface which abuts the bottom of a stop surface or flange 133 projecting forwardly at the upper limit of the rear wall 28 flush with the work surface 12, to retain the cover plate 160 flush with the work surface 12 in the closed condition so that the cover plate 160 does not rest against the cables 6, 8. The flange 133 bears the st rain of downward pressure on the cover plate 160 to prevent the cover plate 160 from dislodging from the pivot 62 in the event that a load is placed on top of the receptacle 20. The rear member 164b abuts the wall 132 when the cover plate 160 is open, and prevents the cover plate 160 from overextending the intended arc of motion and becoming dislodged from the pivot 162.

To assemble the receptacle 20 of the invention, the front portion 20a is engaged to the rear portion 20b by sliding the enlargement 31a into the channel 31b until the portions 20a, 20b are in alignment. The partition plate 50 is engaged to the lips 24 on the front and rear portions 20a, 20b. The hinge 64 of the cover plate 60 (or the hinge 164 of the cover plate 160) is slid or snapped onto the pivot 62, and the end plates 23 are affixed by suitable fastening members to the receptacle 20.

In use a single receptacle 20 may be employed, for example at a personal workstation or research cubicle, or multiple receptacles 20 may be used as in the table 10 illustrated in FIG. 1. Openings dimensioned to receive the receptacles 20 are cut or otherwise formed through the work surface 12. The receptacle 20 is assembled and the strain relief sleeves 38a, 38b are inserted through the openings 36a, 36b, respectively, in the rear wall 28 of the concealed compartment 30. The receptacle 20 is mounted to the table 10 from underneath and affixed by screws 29 or other suitable fastening members, and electrical wiring 7, 9 from a remote power supply, communications devices etc. (not shown) is inserted through the strain relief members 38 (multiple receptacles 20 may be wired in parallel beneath the table 10). The partition plate 50 is removed and the ports 2, 4 are mounted into their respective openings 52. The required electrical connections between the ports 2, 4 and the wiring 7, 9 are made in conventional fashion, and the partition plate 50 is snap-fitted to the receptacle 20.

To connect a workstation device a user simply lifts the cover plate 60 (or 160) to the open position and inserts the plugs for the power supply and/or communications cables 6, 8 into the appropriate ports 2, 4 as required. The user has a direct line of sight to the partition plate from a position standing in front of the table 10, and can insert a plug into the port 2 or 4 using a natural lateral thrusting motion which is similar to that used when plugging a cord into a wall receptacle. The cover plate 60 (or 160) may be closed without interference by the cables 6, 8 egressing through the gap 58.

A preferred embodiment of the invention having been thus described by way of example only, it will be apparent to those skilled in the art that certain modifications and adaptations may be made without departing from the scope of the invention, as set out in the appended claims.

I claim:

1. An electrical receptacle adapted to be recessed into a work surface, comprising:

a concealed compartment containing ports in electrical communication with at least one remote device or power source and an exposed compartment for connecting electrical cables to the ports, accessible through the work surface, and a cover plate positioned substantially flush with the work surface having a width and a length and having a hinge extending longitudinally along an intermediate portion of the width, the hinge being spaced from an edge of the cover plate; the hinge comprising a channel adapted to engage a bead to mount the cover in pivotal relation to the compartment.

2. The electrical receptacle of claim 1 in which the hinge comprises a front member and a rear member which together form a channel having an arc greater than 180° to prevent dislodgment from the pivot.

3. The electrical receptacle of claim 2 in which the channel and the pivot are substantially circular in cross-section.

4. The electrical receptacle of claim 2 in which the bead is disposed along an upper edge of a hinge wall projecting upwardly from a rear wall of the receptacle.

5. The electrical receptacle of claim 4 in which the rear member abuts the hinge wall when the cover plate is in the open position.

6. The electrical receptacle of claim 5 in which the cover plate opens to an angle greater than 90° so as to free-stand in the open position.

7. The electrical receptacle of claim 4 in which the rear wall of the receptacle provides a stop flange projecting forwardly therefrom and a rear edge of the cover plate abuts the stop flange when the cover plate is in the closed position.

8. The electrical receptacle of claim 7 in which the rear edge of the cover plate is recessed.

9. The electrical receptacle of claim 2 in which a front edge of the cover plate is spaced from a front wall of the receptacle so as to allow electrical cables to egress from the receptacle when the cover is in the closed position.

10. A work surface having at least one electrical receptacle mounted therein, the electrical receptacle comprising:

a concealed compartment containing ports in electrical communication with at least one remote device or power source and an exposed compartment for connecting electrical cables to the ports, accessible through the work surface, and a cover plate positioned substantially flush with the work surface having a width and a length and having a hinge extending longitudinally along an intermediate portion of the width, the hinge being spaced from an edge of the cover plate; the hinge comprising a channel adapted to engage a bead to mount the cover in pivotal relation to the compartment.

11. The work surface of claim 10 in which the hinge comprises a front member and a rear member which together form a channel having an arc greater than 180° to prevent dislodgment from the pivot.

12. The electrical receptacle of claim 11 in which the channel and the pivot are substantially circular in cross-section.

13. The work surface of claim 11 in which the bead is disposed along an upper edge of a hinge wall projecting upwardly from a rear wall of the receptacle.

14. The work surface of claim 13 in which the rear member abuts the hinge wall when the cover plate is in the open position.

15. The work surface of claim 14 in which the cover plate opens to an angle greater than 90° so as to free-stand in the open position.

16. The work surface of claim 13 in which the rear wall of the receptacle provides a stop flange projecting forwardly therefrom and a rear edge of the cover plate abuts the stop flange when the cover plate is in the closed position.

17. The work surface of claim 16 in which the rear edge of the cover plate is recessed.

18. The work surface of claim 11 in which a front edge of the cover plate is spaced from a front wall of the receptacle so as to allow electrical cables to egress from the receptacle when the cover is in the closed position.

* * * * *